Aug. 22, 1967     E. J. SELLECK     3,336,771
HUB CAP AND WHEEL LOCKING DEVICE
Filed July 16, 1965
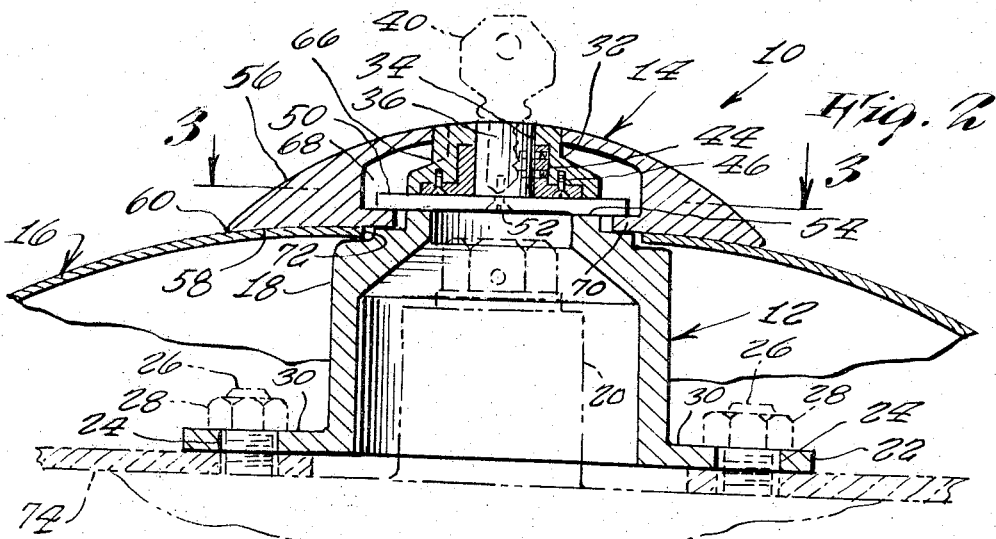
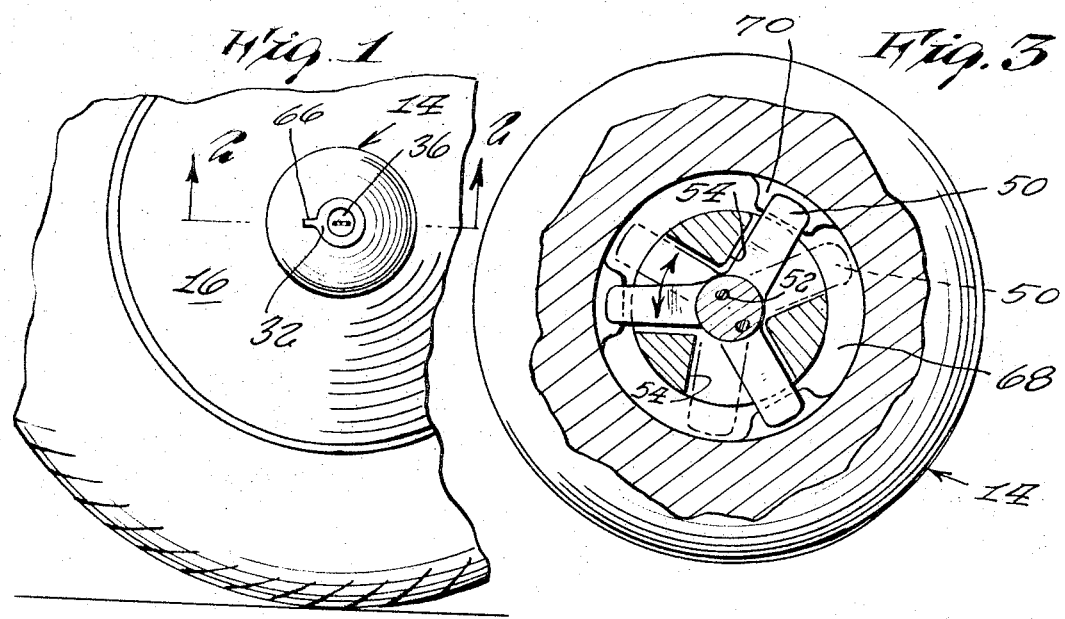
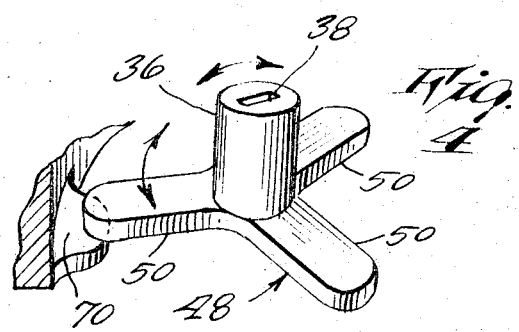
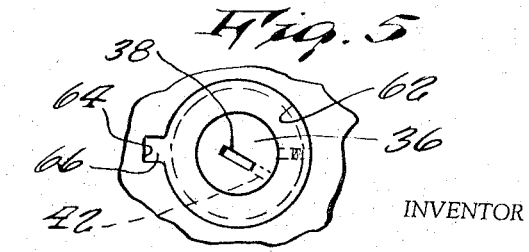
INVENTOR
EDWARD J. SELLECK
BY Jacob L. Kollin,
ATTORNEY United States Patent Office 3,336,771
Patented Aug. 22, 1967

3,336,771
HUB CAP AND WHEEL LOCKING DEVICE
Edward Joseph Selleck, 955 82nd St.,
Brooklyn, N.Y. 11228
Filed July 16, 1965, Ser. No. 472,507
3 Claims. (Cl. 70—259)

ABSTRACT OF THE DISCLOSURE

A hub cap and wheel locking device having a sleeve positioned over a wheel hub and secured to the wheel. A removable hollow cover fits over the other end of the sleeve and overlaps the hub cap. The cover has inwardly projecting lugs. A rotatable bolt in the sleeve has laterally extending arms releasably engageable with the lugs to prevent the removal of the cover and the hub cap. A tumbler lock in the sleeve locks the bolt when the arms are in engagement with the lugs.

---

This invention relates generally to automotive accessories. More specifically it relates to hub cap and wheel locking devices.

It is generally well known to those skilled in the art that theft of hub caps and wheels are commonplace occurrences. Such thefts can be expensive in view of the costs of these automotive parts, as well as of the tires mounted upon the wheels. In some such thefts, after removal of the wheel, the axle is allowed to drop down on the street, particularly when the thief is anxious to get away fast, such fall possibly bending or otherwise damaging the axle hub. Beside these costs there is the inconvenience of re-mounting another wheel before the car can be used again. Accordingly, this condition is undesirable and in want of improvement.

Accordingly, it is an object of the present invention to provide a locking device having self-contained means to lock the hub cap upon the wheel for preventing removal of the hub cap and thus prevent gaining access to the wheel bolts for removal of the wheel.

Another object is to provide a locking device wherein the above automotive parts can all be retained by such device consisting of a single locking unit.

Another object is to provide a locking device that is adaptable to be commercially sold together with automotive hub caps, in view of the association of these parts, to fit one another, thereby promoting the sale of new hub caps.

Another object is to provide a locking device adaptable for use on old hub caps (if so preferred) and wherein the old hub cap requires only that an opening of proper size be drilled out at the center thereof.

Still another object is to provide a locking device having a pleasing streamlined outer appearance that will add to the attractiveness of the car.

A still further object is to provide a locking device providing an additional cover over the wheel bolts to further prevent in line access thereto even if the hub cap were forcibly bent.

Other objects are to provide a locking device that is simple in design, inexpensive to manufacture, rugged in construction, easy to install and remove and efficient in operation.

These and other objects will be readily apparent upon a study of the following specification and the accompanying drawing wherein:

FIG. 1 is a fragmentary outer side view of an automotive wheel assembly showing the invention incorporated therewith;

FIG. 2 is an enlarged detailed cross-sectional view taken on line 2—2 of FIGURE 1;

FIG. 3 is a cross-sectional view taken on line 3—3 of FIG. 2;

FIG. 4 is a perspective view of a position of the locking device and

FIG. 5 is a face view of the lock in unlocked position.

Referring now to the drawing in detail, the numeral 10 represents a hub cap and wheel locking device according to the present invention wherein there is a spider or sleeve 12 and hub cap cover 14 which fits over a hub cap 16.

The spider 12 has a cylindrical sleeve 18, which fits over an axle hub 20 of an automobile. At one end of the sleeve there is a radially outward extending flange 22 having openings 24 therethrough for receiving wheel bolts 26. Nuts 28 mounted on bolts 26 bear against surface 30 of the flange 22 when the device is mounted upon a vehicle. At the opposite end of the sleeve there is a generally conically tapered end 32 having a central opening 34 therethrough, within which a lock barrel 36 is mounted.

An end opening 38 in the barrel provides access for a key 40 for sliding springloaded tumblers 42 in a manner well known in locks for locking and unlocking the barrel from a lock sleeve 44 into which the tumblers slide. The lock sleeve is secured by screws 46 to end 32. A rotatable bolt 48 having radial arms 50 is secured by screws 52 to the end of the barrel thereby providing rotation of the arms when the barrel is turned by the key and also preventing removal of the barrel out of the end 32.

The arms 50 extend out of slots 54 in the sides of the end 32.

The hub cap cover 14 is of generally hemispherical configuration, having a convex outer wall 56 for streamlined appearance, a flat or concave rear wall 58 to fit over the outer face of the hub cap and a circular peripheral edge 60. The hub cap cover has a central opening 62 through which the terminal portion of end 32 is slidably received. A keyway 64 in opening 62 receives a key 66 formed on the end 32 for preventing rotation of the hub cap cover relative to the spider. The opening 62 communicates with a central chamber 68 within the cover 14. A plurality of radially inward extending lugs 70 protrudes into the chamber and provides engagement means with arms 50 for locking the cover on the spider.

The hub cap 16 has a central opening 72 to permit movement of the hub cap over the arms 50 when it is desired to gain access to the wheel bolts 26.

In operative use, when it is necessary to remove the wheel (such as when a flat tire has occurred) the motorist simply inserts a key in the lock and turns the barrel, thus moving arms 50 out of engagement with the lugs 70 and permitting removal of the cover 14 and hub cap 16.

Thus access is provided to unscrew nuts 28 and remove the wheel 74 from the axle assembly 76. After a new wheel assembly is installed the process is repeated in reverse thus securely locking the assembly against any unauthorized access thereto.

Having thus set forth my invention, what I claim as new and desire to secure by Letters Patent of the United States is:

1. In a hub cap and wheel locking device, the combination of a spider member, a hub cap and a hub cap cover, said hub cap cover being removably secured on one end of said spider member, said hub cap cover comprising an element having a front and rear side wall bounded by a periphery, a central opening communicating with a central chamber and a plurality of inwardly projecting lugs in said chamber for engagement with said arm ends, said hub cap being received between said spider and hub cap cover, said spider member comprising a cylindrical sleeve, a radially outwardly extending flange at one end of said sleeve, openings in said flange for receiving wheel bolts of an automotive vehicle therethrough, for securement to a vehicle's wheel, a conically tapered end at the opposite end of said sleeve, a central opening in said end, a rotatable lock barrel within a fixed lock sleeve within said central opening, a rotatable bolt having radially outward extending arms secured to one end of said barrel, the ends of said arms extending out of slots in the sides of said end at one end of said sleeve, said arms releasably engaging said lugs on the cap cover, means on said spider to prevent rotation of said hub cap cover member relative to said spider member.

2. In a hub cap and wheel locking device, the combination as set forth in claim 1, wherein said element is of hemispherical shape.

3. In a hub cap and wheel locking device, the combination as set forth in claim 1, wherein said means to prevent rotation of said cover relative to said spider comprises a key and keyway on said spider and cover respectively.

References Cited

UNITED STATES PATENTS

| | | | |
|---|---|---|---|
| 2,375,671 | 5/1945 | Malluk | 70—168 |
| 2,399,016 | 4/1946 | Gits | 70—168 X |
| 2,847,096 | 8/1958 | Lyon | 70—168 X |
| 3,170,733 | 2/1965 | Lamme | 70—169 X |

FOREIGN PATENTS 47,122   10/1936   France.

BOBBY R. GAY, *Primary Examiner.*